US006995662B2

(12) United States Patent
Wortsmith

(10) Patent No.: US 6,995,662 B2
(45) Date of Patent: Feb. 7, 2006

(54) VEHICLE POSITIONING APPARATUS

(76) Inventor: Joe W. Wortsmith, 48 Perin Rd., North Little Rock, AR (US) 72118

( * ) Notice: Subject to any disclaimer, the term of this patent is extended or adjusted under 35 U.S.C. 154(b) by 234 days.

(21) Appl. No.: 10/430,725

(22) Filed: May 6, 2003

(65) Prior Publication Data

US 2004/0222902 A1 Nov. 11, 2004

(51) Int. Cl.
*B60Q 1/00* (2006.01)

(52) U.S. Cl. ...................... 340/435; 340/466; 340/903; 340/932.2; 340/686.2; 340/431; 340/539.16; 340/539.22

(58) Field of Classification Search ................ 340/345, 340/346, 903, 932.2, 686.2, 431, 539.16, 340/539.22
See application file for complete search history.

(56) References Cited

U.S. PATENT DOCUMENTS

| | | | | |
|---|---|---|---|---|
| 2,934,755 | A | 4/1960 | Canada | |
| 3,149,196 | A | 9/1964 | Roth | |
| 3,690,767 | A | 9/1972 | Missio et al. | |
| 4,405,205 | A | 9/1983 | Rossmann | |
| 4,552,376 | A | 11/1985 | Cofer | |
| 4,678,329 | A | 7/1987 | Lukowski, Jr. et al. | |
| 4,684,247 | A | 8/1987 | Hammill, III | |
| 5,285,205 | A | 2/1994 | White | |
| 5,343,295 | A | 8/1994 | Lara et al. | |
| 5,406,395 | A | 4/1995 | Wilson et al. | |
| 6,150,938 | A | 11/2000 | Sower et al. | |
| 6,178,650 | B1 * | 1/2001 | Thibodeaux | 33/286 |
| 6,222,457 | B1 | 4/2001 | Mills et al. | |
| 6,252,497 | B1 | 6/2001 | Dupay et al. | |
| 6,386,572 | B1 | 5/2002 | Cofer | |
| 6,388,748 | B1 | 5/2002 | Kokura | |
| 6,429,420 | B1 * | 8/2002 | Babst et al. | 250/221 |
| 6,486,798 | B2 | 11/2002 | Rast | |

* cited by examiner

*Primary Examiner*—Tai T. Nguyen
(74) *Attorney, Agent, or Firm*—J. Charles Dougherty

(57) ABSTRACT

A vehicle positioning apparatus is shown and described. The positioning apparatus is adaptable for the guidance of a vehicle into a limited space, such as in the case of a boat approaching a dock, slip, or trailer. The vehicle includes two emitters, producing two images reflected to the operator of the vehicle. The emitters are spaced from each other in such a manner that the operator may determine direction, orientation, and other critical parameters of the vehicle during approach to the limited space by viewing of the reflected images. Targets may be employed to enhance the image seen by the operator.

16 Claims, 5 Drawing Sheets

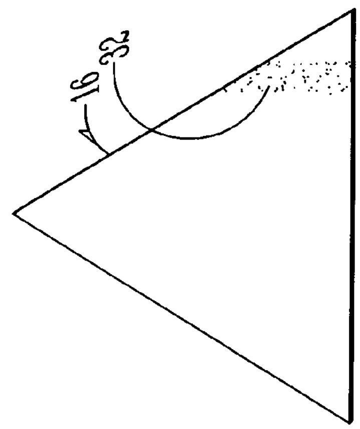
FIG. 4B
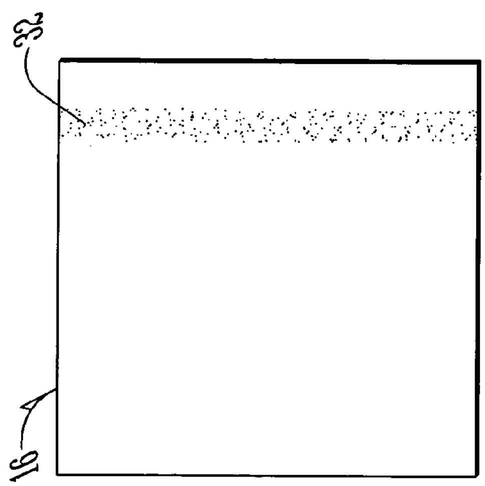
FIG. 3B
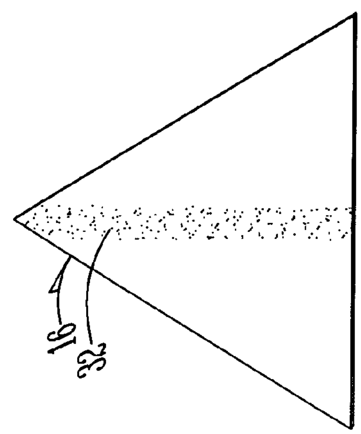
FIG. 4A
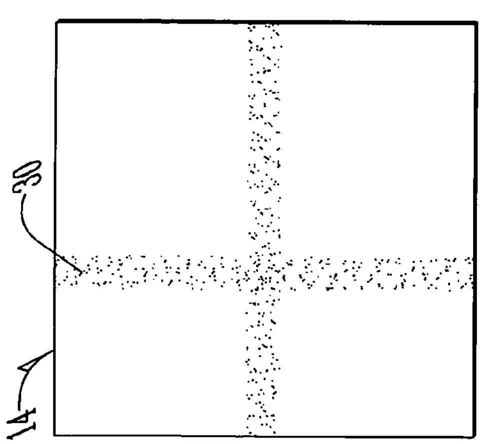

VEHICLE POSITIONING APPARATUS

BACKGROUND OF THE INVENTION

The present invention relates to vehicle positioning systems, and in particular to vehicle position systems using emitters positioned on the vehicle and with respect to each other so as to provide a simple and effective means of directing the vehicle into, out of, or through a small space.

Since ancient times, it has been recognized that the control of a ship during docking is a task that requires great skill of the ship's helmsman and crew. Such skill is required because of the many and varied factors that can influence the motion of a vessel on the water. Currents in the water, waves, and winds exert significant effects on vessels attempting to dock. Other factors include the condition of the vessel; the size and shape of the vessel's hull; the position of the helm on the vessel; the nature, number, and location of propulsion systems on the vessel; the size and configuration of the dock or slip used; and the amount and nature of involvement from other persons either on board or on shore. Larger vessels have considerable inertia, and thus compensation for all of these effects becomes progressively more difficult as the size of the ship increases. Also, the effect of many of these factors is increased due to the low water speed at which docking generally takes place. Failure to properly compensate for these multiple and changeable effects may result in a disastrous collision between the vessel and its dock. In particular, it may be recognized that even if the bow of the vessel is correctly pointed at its target docking location, if the overall alignment of the boat is incorrect with respect to the dock, the result may be that the stern of the vessel swings as the dock is reached, causing a collision between the dock and side of the vessel. This particular problem is a common cause of damage to both watercraft and dock facilities even today.

Problems in approaching a dock or slip are not experienced only by the largest ocean-going vessels. Such difficulties are also encountered with smaller boats and watercraft, especially those with limited maneuverability relative to their size, such as yachts, cruisers, and houseboats. To perhaps a lesser extent, such problems may even be experienced with small, maneuverable watercraft, such as fishing boats, ski boats, and personal watercraft. All such vessels are typically brought into position at their slips or docks by a single pilot, without the aid of on-shore spotters or complicated electronic guidance systems. A similar problem is faced by the operator of a smaller boat when attempting to align the boat with a submerged boat trailer used to haul the boat over land.

It may be seen that there are two critical components of the vessel's direction and orientation that are important during docking. The first is the position of the vessel's bow relative to its dock or slip during approach. Assuming that the docking is to take place in the forward direction, the bow of the vessel should be pointed toward the dock as the docking maneuver begins. The second critical component is the orientation of the vessel with respect to the bow. Both types of information are critical, since a failure to maintain alignment of the boat's stern may cause a crash even if the bow of the boat is perfectly oriented with respect to the dock, slip, or trailer. It will be recognized that considerable experience and skill are necessary to simultaneously maintain both the bow and stern of the vessel in position during docking. As the pilot turns his or her head in an attempt to gather information about the position of the ship's stern, he or she is distracted at a critical time, which may cause the bow of the ship to fall out of alignment. Even an experienced pilot may be unable to successfully guide a vessel into its dock or slip if, for example, an unexpected wind or current change were to occur at a critical moment.

It should also be recognized that many of the same issues faced during the docking of watercraft are also of concern during the parking of land vehicles, particularly segmented vehicles such as tractor trailers, within tightly enclosed spaces. The position of the nose of the vehicle, as well as the position and orientation of the rear or trailer portion of the vehicle, must be precisely controlled to make such parking maneuvers possible. Again, experience and skill are required on the part of the operator to successfully perform such maneuvers without assistance.

The prior art includes numerous attempts to address these sorts of difficulties, none of which are wholly practical and feasible for all purposes and applications. U.S. Pat. No. 5,285,204 to White teaches a guidance system to aid in the position of a car within a garage, drive-through service lane, loading dock, or the like. The system uses a laser outside the vehicle that is intended to strike a target on the front of the vehicle. The driver then steers the vehicle so as to maintain the laser on the target as the vehicle moves into position. While this simple method of alignment may be sufficient for some purposes, such a method lacks any capability for independently aligning the rear portion of the vehicle, which may be important for reasons as described above. The method would also be inadequate for the docking of watercraft, since the stern of such a vessel is, as already explained, subject to movement and rotation with respect to the bow from myriad forces acting on the vessel. This single laser system would provide the helmsman of such a vessel with no information whatsoever about the position and orientation of the vessel's stern.

U.S. Pat. No. 3,149,196 to Roth teaches another guidance system to aid in the parking of a car or other vehicle in a tightly enclosed space. Roth '196 teaches that a light mounted on the side of the vehicle shines against a target mirror, with the light then being reflected to the vehicle's driver. Thus Roth '196 teaches a system in which the positions of the emitter and sensor are reversed from that of White '204. The driver is able to align the vehicle by maintaining the appearance of the reflected light in the center of the mirror. This approach; which again relies upon a single illumination source, suffers from the same disadvantages and limitations as described above for White '204.

The prior art also includes numerous attempts to address the docking or movement of a vehicle or vessel that incorporate two or more optical emission devices. U.S. Pat. No. 5,343,295 to Lara et al., for example, teaches a system for the alignment of an electrically powered vehicle with its recharging station. The system incorporates two laser emitting diodes mounted on the vehicle. These beams cross at a distance in front of the electric vehicle that is equal to the distance at which the vehicle should be positioned from the recharging unit in order for recharging to take place. The vehicle's driver may thus drive toward the recharging unit with the beams activated, stopping at the point where the beams striking the recharging unit are directed to the same spot. This alignment technique, like the one-emitter system described above, is insufficient for many applications because it includes no means by which the rear or stern of a vessel may be separately aligned. In this case, both beams emanate from laser emitting diodes mounted on the front of the vehicle, and thus no information about the relative position and orientation of the rear of the vehicle is utilized in positioning the vehicle.

U.S. Pat. No. 6,486,798 to Rast teaches a system for preventing damage to the wings of an aircraft while taxing in tight spaces. An illumination source is attached to both wingtips. If light from the illumination sources strikes an object or surface that lies directly in front of the wingtip, that light is reflected back to the eyes of the aircraft's pilot, who can then turn or stop the aircraft to avoid a collision. Again, this system contains no means for separate alignment of the rear of the aircraft. Like the device taught by Lara et al. '295, this device includes two illumination sources, but neither of those illumination sources provide the operator with any information about the position or orientation of the rear of the craft. The purpose of the Lara et al. '295 device is to simply make the pilot aware of obstacles in the path of the aircraft's wings.

There are docking systems in use today that utilize multiple LIDAR (laser detection and ranging) units to aid in ship guidance. For example, U.S. Pat. No. 3,690,767 to Missio et al. teaches an optical docking system for large ocean-going vessels that utilizes LIDAR-type laser pulse range radar systems. Two pulse range radar systems are installed at the vessel's dock. The vessel itself has a reflector mounted at its bow and stern. The pulse range radar systems are each directed to one of the ship-mounted reflectors, and continuously track their position as the craft approaches the dock. The system continuously calculates and records the time of travel of the laser beam from the dock to the reflector and back to the dock. By continuously calculating and comparing these values for the bow and stern reflectors, one may calculate the distance and velocity of the ship's bow and stern independently. This information is displayed in numerical form on a computer screen accessible to the ship's captain, thus providing the captain with additional information to aid in the maneuver and docking of the vessel.

While the system of Missio et al. '767 does, unlike the previously discussed prior art, provide information about the position and velocity of the stern of a vessel independently from the bow of that same vessel, this system still suffers from significant limitations. The two pulse range radar devices necessary in order to make this system operable are quite complex and expensive. Two such devices would be necessary at each dock or slip where the vessel is to be moored. While the cost of such devices might be feasible when the docking vessel is a large, ocean-going vessel carrying a massive and valuable cargo, such a system could not be feasible when the pulse range radar devices represent a significant cost with respect to, and perhaps even greater than, the cost of the vessel itself. Such will generally be the case when considering most yachts, houseboats, and other smaller watercraft designed for personal use. In addition, some means must be implemented in connection with a LIDAR-type system such that each of the two pulse range radar devices track their respective reflectors on the vessel. Missio et al. '767 teaches that the radar devices must initially be aligned with the reflectors on the ship manually. This would of course require at least one operator on the shore in order to set the initial alignment. Thus this device would be impractical at any dock or slip facility that did not maintain permanent personnel for such purpose. Again, this would make this device impractical for most docks or slips used by all but the largest commercial vessels.

Finally, there are a number of docking systems in use today that do not utilize LIDAR techniques but that to some extent serve to automate or semi-automate the docking process. These integrated systems may involve GPS (global positioning system) satellite guidance, electromechanical guidance, and autopilot manipulation. Such systems may be fixed to the dock or mounted on a vessel. In any case, such systems are very expensive, and require considerable training and skill for operation due to their complexity. They are thus, like the LIDAR systems described above, impractical for many important applications, including the vast majority of watercraft intended for personal use.

What is desired then is an inexpensive, simple-to-operate system for the guidance of vessels into and out of a dock or slip that allows for simultaneously monitoring and control of not only the position of the bow of a vessel but also the position and orientation of its stern. Such a system would also be of utility in many other related applications, such as the movement of any sort of vehicle into, out of, and through tight or enclosed spaces. This desire is fulfilled, and the limitations of the prior art overcome, by the present invention as described below.

BRIEF SUMMARY OF THE INVENTION

The present invention is directed to a system that includes the use of two emitters to guide a vehicle into, out of, and through tight or enclosed spaces. For purposes hereof, the term "vehicle" shall include any machine designed for the purpose of conveyance of people or cargo, whether by land, sea, air, space, or otherwise. In the preferred embodiment, however, the invention is used to guide a small- or medium-sized watercraft, such as a yacht, cruiser, or houseboat, into a desired position with respect to a dock, slip, or trailer. It should be understood that the invention is not limited to this preferred embodiment, and may in fact be used with all sorts of watercraft, aircraft, trucks, and other vehicles when the capability of fitting such craft into tight or enclosed spaces is desired.

The invention comprises two emitters, preferably both emitters being optical light sources, and in particular both emitters preferably being collimated light sources such as laser generators. One emitter is preferably mounted at the nose or bow of the vehicle, pointed forward and preferably along the centerline of the vehicle. The second light source is preferably mounted at the rear of the vehicle, also pointed in a direction parallel to the centerline of the vehicle, but preferably mounted to one side of the first emitter. The dock, slip, trailer, or other desired resting area for the vehicle is fitted with two targets, which are aligned such that the image generated by each of the emitters is centered on the corresponding target when the vehicle is aligned correctly for entry. A single large target may alternatively be used. The horizontal physical separation of the emitters provides steering and orientation information to the vehicle's pilot, without the necessity of the pilot periodically looking to the rear or stern of the vessel to ensure proper alignment of that portion of the vehicle.

It should be noted that the present invention also comprises the use of a reversed arrangement for the purpose of maneuvering vehicles that are guided into docks or other tight spaces using reverse motion. It is, for example, common to maneuver a yacht or houseboat into a slip backwards, and in such case the emitters may be, for example, mounted on the stern of the vessel at the centerline, and near the bow of the vessel on one side of the centerline. In this case the bow light source is used to aid in the monitoring of bow drift as herein described with respect to the stern for forward entry.

The present invention has a number of significant advantages over prior art attempts to solve the problems addressed herein. First, it should be noted that the mounting of the emitters on the vessel rather than the slip or dock provides distinct advantages. If a ship regularly travels to numerous docks, each dock need not be fitted with emitters, but only needs to be fitted with the targets. The targets are considerably less expensive than the emitters, draw no power, and require less care and upkeep than the emitters. This fact makes this approach particularly advantageous for the sorts of docks and slips typically used for yachts, houseboats, and the like, since such places generally have no personnel assigned to continually monitor the coming and going of boats, and may have no electrical power connections immediately available. This fact also makes this approach advantageous for the maneuver of land and air vehicles within tight spaces, and the maneuver of a boat onto a submerged trailer.

In addition, the present invention requires no specialized techniques or processes to initially align the emitters with their targets. In the case of the present invention, the pilot of the vessel simply performs a rough alignment of the vessel and targets through a maneuvering of the vessel itself. No direct manipulation of the emitters or targets is required. Prior art LIDAR-based systems require an initial hand alignment by an operator on shore, then complex automatic tracking. The present invention's simple alignment method allows the invention to be produced at a greatly reduced cost as compared to prior art systems intended to perform similar functionality, and allows the present invention to be used at slips or docks where no personnel are available to aid in alignment operations. As already noted, this makes the invention particularly well suited for certain applications, such as the alignment of yachts, houseboats, and the like at their typically unmanned slips or docks.

It is therefore an object of the present invention to provide for a vehicle positioning system that allows an operator to monitor the position of both the forward and rearward positions of a vehicle simultaneously.

It is a further object of the present invention to provide for a vehicle positioning system that utilizes two emitters horizontally displaced from one another to provide both alignment and orientation information to the operator.

It is a further object of the present invention to provide for a vehicle positioning system that is inexpensive.

It is a further object of the present invention to provide for a vehicle positioning system that is simple to operate.

It is a further object of the present invention to provide for a vehicle positioning system that requires no powered equipment located other than on the vehicle itself.

These and other features, objects and advantages of the present invention will become better understood from a consideration of the following detailed description of the preferred embodiments and appended claims in conjunction with the drawings as described following:

BRIEF DESCRIPTION OF THE SEVERAL VIEWS OF THE DRAWINGS

FIG. 3B is an illustration of the laser image appearing on docking targets during a docking maneuver with the vessel in an incorrect alignment utilizing a preferred embodiment of the preferred invention.

FIG. 4A is an illustration of the laser image appearing on a triangular docking target during a docking maneuver with the vessel in a correct alignment utilizing an alternative embodiment of the preferred invention.

FIG. 4B is an illustration of the laser image appearing on a triangular docking target during a docking maneuver with the vessel in an incorrect alignment utilizing an alternative embodiment of the preferred invention.

DETAILED DESCRIPTION OF THE INVENTION

Figure 1:
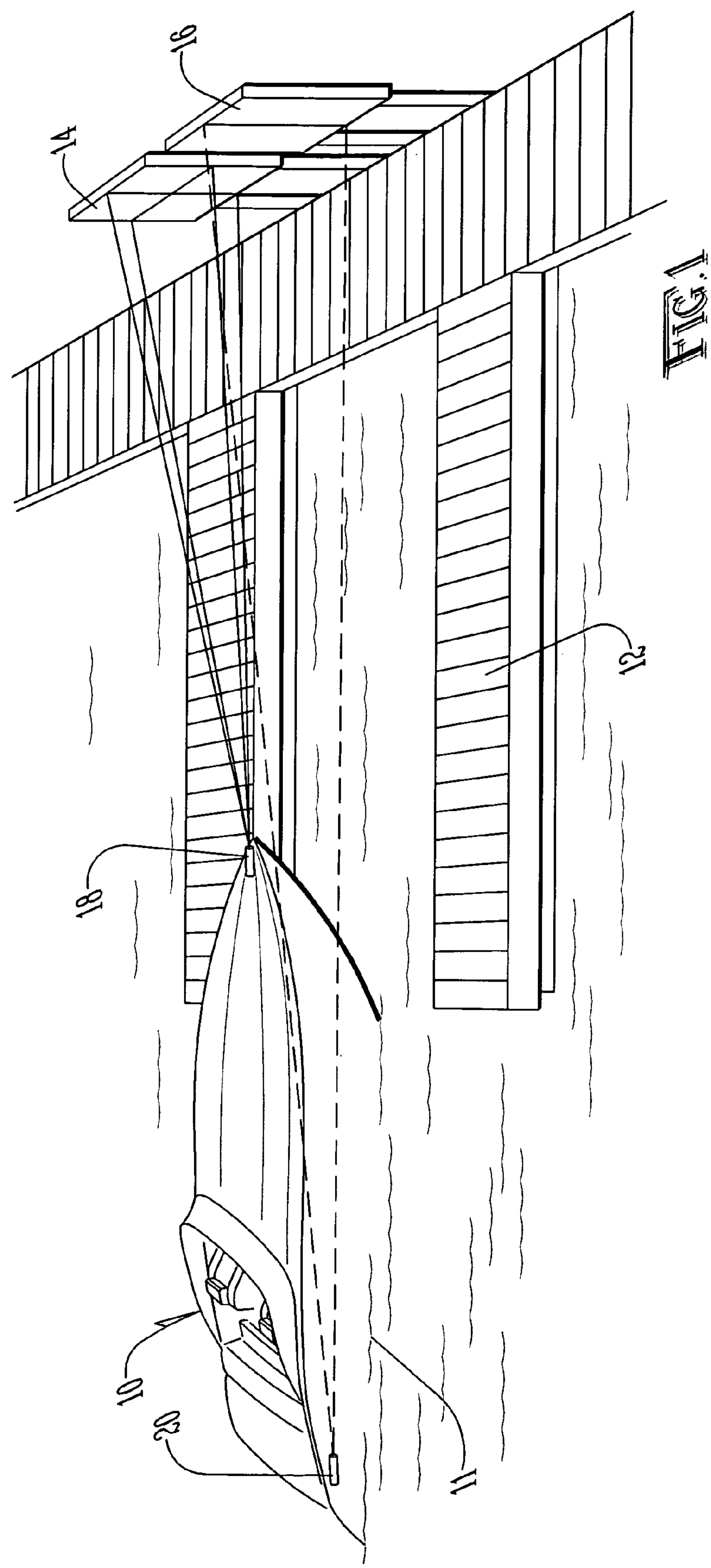
FIG. 1 is a perspective view of a vessel utilizing a preferred embodiment of the preferred invention.

With reference to FIG. 1, the preferred embodiment of the present invention may now be described. Watercraft 10 afloat in body of water 11 is to be brought into slip 12. (Certain details of slip 12 have been omitted for clarity.) In the preferred embodiment, watercraft 10 is a yacht, cruiser, houseboat, or similar watercraft that is typically moored at docks or slips designed for boats employed for personal rather than commercial use. It should be noted, however, that the invention is not so limited, and the present invention may in fact be used in connection with any sort of vehicle that must be navigated into, out of, or through a small or enclosed space. In addition, while slip 12 is shown as used in connection with the preferred embodiment, alternative embodiments may replace slip 12 with a dock, boat trailer, or any other limited space into which a vehicle may be maneuvered for various purposes.

Mounted on watercraft 10 are first emitter 18 and second emitter 20. In the preferred embodiment, first emitter 18 and second emitter 20 are laser generators, such as the diode-based, visible light laser generators produced by Laser Tools Co., Inc. of Little Rock, Ark. More specifically, first emitter 18 is preferably a laser crosshair generator and second emitter 20 is preferably a laser line generator. Laser line generators produce a line of a given length at a predetermined distance by incorporating a diffractive element at the laser output lens, which breaks the collimated beam of light into small subsections of the original beam. These subsections of the original beam are then redirected to form a pattern that appears to the viewer's eye as a line due to the retention of vision effect. Such a device is commercially available from Laser Tools Co., Inc. as, for example, the Model L350 Industrial Alignment Laser with the optional CL1000 Line Generator Optics. A laser crosshair generator may be constructed by combining two line generators such that the lines emitted by the generators cross orthogonally. Such a generator is commercially available as an integrated unit from Laser Tools Co., Inc. as the Model L600 Laser Crosshair Line Generator. These devices may be powered by watercraft 10 onboard power supply or by batteries dedicated to laser generator use. Such devices include optics that allow the operator to vary the length of the lines produced, and also include course and fine position adjustment means allowing the operator to sight the devices prior to first use and to make adjustments periodically as required. Other available options in alternative embodiments include, but are not limited to, brightness control for the emitters, quick-release attachment points to facilitate storage of emitters 18 and 20 when watercraft 10 is left unattended, pulsing laser beams, beams of different colors, beam modulation, electronic detection, and various optical effects applied for aesthetic reasons. In the preferred embodiment emitters 18 and 20 are mounted on the exterior of watercraft 10, but either or both of emitters 18 and 20 could be integrated into the hull or deck of watercraft 10, so long as an unobstructed path is maintained in front of emitters 18 and 20.

Alternative embodiments of the present invention may comprise alternative implementations of first emitter 18 and second emitter 20. Any form of emitter 18 and second emitter 20 capable of generating a visible image at a distance may be utilized. For example, a simple laser diode emitter that produces a Gaussian laser image could be employed for both first emitter 18 and second emitter 20. Because the Gaussian image is brighter at its center than its edges, the operator could use the relative brightness of the image as a means of guidance. Non-laser emitters 18 and 20 could be implemented as simple projection devices, although the range of emitters 18 and 20 for a given power requirement would be reduced without the use of the collimated light produced by laser generators.

In the preferred embodiment, first emitter 18 is mounted on watercraft 10 along its centerline, with first emitter 18 aligned such that it generates an image directly ahead of watercraft 10. Second emitter 20 is mounted on one side of watercraft 10, at or near its stern. Second emitter 20 is mounted such that it generates an image along a line parallel to the centerline of watercraft 10. Thus emitters 18 and 20 produce images along parallel lines, the distance between those lines being the horizontal (that is, cross-beam) distance between emitters 18 and 20. The significance of this placement of emitters 18 and 20 will be discussed below in reference to the employment of the preferred embodiment of the present invention during a docking maneuver.

Mounted at slip 12 are first target 14 and second target 16. In the preferred embodiment, first target 14 and second target 16 are constructed from sheets of reflective film, such as sheets that contain broken glass shards, transparent glass micro beads, or glass spheres embedded within the film substrate. An example of such a reflective material may be purchased from the 3M Corporation of Minneapolis, Minn. as ScotchLite brand reflective sheeting series 3200. This film possess the property that when it is struck by collimated light, it reflects the majority of the light, doing so in a relatively wide reflected cone. Thus when light from emitters 18 and 20 strikes targets 14 and 16, a cone is created in front of targets 14 and 16 such that anyone whose eyes fall within this cone can see the image formed by emitters 18 and 20 on targets 14 and 16. This wide cone but high degree of reflectivity permits the viewing of the laser images from emitters 18 and 20 at considerable distance and during daylight hours.

The placement of targets 14 and 16 may vary, as desired to match the height and position of emitters 18 and 20 as watercraft 10 approaches slip 12. Since most slips used by recreational boaters are uncovered, the preferred mounting point for targets 14 and 16 may be just above the waterline at the face of the decking of slip 12 itself. In the case where slip 12 is of the covered variety, other alternative mounting points may be employed within the support frame or overhead supporting structure of slip 12.

In preferring a material for targets 14 and 16 that produces a relatively wide cone of reflection, the preferred embodiment of the invention takes an approach that is opposite of that applied in many prior art applications, such as reflectors used for LIDAR applications. In those cases, the intensity of the reflected beam is of utmost importance since electro-optical equipment will be used to detect the reflected beam. In the case of the present invention, no such equipment is required, and the only sensor required to detect the returning pattern is the eye of the pilot of watercraft 10. It has been determined that the brightness of the sort of lasers as used in the preferred embodiment of the present invention is sufficient to produce an image visible at a distance of over 200 feet in broad daylight, even when the reflective cone is relatively broad as a result of using targets 14 and 16 formed of a material as herein described. The advantage of using such materials, and thereby producing a wide reflective cone, is that the images will be viewable at a greater angle, thus providing the pilot of watercraft 10 with a greater tolerance in his initial approach to slip 12 and rough alignment with slip 12 done by eye alone prior to employment of the present invention for fine adjustments. If the reflective cones from targets 14 and 16 were too narrow, the pilot of watercraft 10 might be unable to perform a sufficiently accurate rough alignment of watercraft 10 such that the reflections of light from emitters 18 and 20 striking targets 14 and 16, respectively, would become visible, thereby rendering the system unusable.

In the preferred embodiment, targets 14 and 16 are square or rectangular in shape, with size in the range of 24 inches by 24 inches to fifteen inches by 240 inches. It is believed that this size range provides the best results for use in connection with houseboats, yachts, and similar watercraft and the ranges typically required during the docking of such vessels. It should be noted that the size of targets 14 and 16 may vary within the scope of the present invention, as required based on the power of emitters 18 and 20, the size and type of boat, the size and type of dock or slip being used, ambient lighting and weather conditions, and other factors.

In alternative embodiments of the present invention, targets 14 and 16 may be combined into a single long target 15 (not shown). Target 15 is preferably of a rectangular shape, with sufficient length to allow both emitters 18 and 20 to strike it as in the case of separate targets 14 and 16 described above. The use of a single target 15 provides an advantage in that at least one of patterns 30 and 32 may be viewed on target 15 across a wide angle of incidence between watercraft 10 and slip 12. Thus the operator of watercraft 10 is given greater tolerance in connection with the initial rough alignment required for the use of the present invention. The use of separate targets 14 and 16 may be more desirable, however, where the size of a single target 15 would create difficulties in securing an appropriate mounting point at slip 12. It is believed that the use of a single target 15 may be most desirable in those situations where an uncovered slip 12 is employed, and single target 15 is mounted to the slip 12 itself at or near the waterline.

In other alternative embodiments of the present invention, the size and shape of targets 14 and 16 may vary. In one alternative embodiment, as illustrated in FIGS. 4A and 4B, targets 14 and 16 may be made triangular in shape with an apex that is vertically oriented. The alternative method of using the present invention for docking at slip 12 with targets 14 and 16 of triangular shape will be described below. In still another alternative embodiment, targets 14 and 16 could be dispensed with entirely, such that emitters 18 and 20 generate images on other surfaces. Such surfaces may include slip 12 itself, buoys, other boats, land masses, particulates in the atmosphere, and simple reflective curtains or sheets draped in the back of the mooring space of slip 12. In these alternative embodiments, clues and aids to navigation and piloting while in a harbor or marina can be shown using emitters 18 and 20 simply as an extension of the ship's axis, along with real-time changes in direction, rate of closure, true heading, projected path, and illumination as described below.

In the preferred embodiment of the present invention, targets 14 and 16 are mounted at such a position and distance from each other that when yacht 10 is properly aligned with slip 12 for entry, the images generated by emitters 18 and 20 strike targets 14 and 16, respectively. Thus the distance between targets 14 and 16 should match the horizontal (that is, the cross-beam) distance between emitters 18 and 20. Additionally, targets 14 and 16 should be placed at a height above water 11 that matches the height of emitters 18 and 20 above the waterline of water 11 when watercraft 10 is afloat. In cases where water level changes significantly, such as on the ocean due to tides, or in areas where water level is controlled by locks or dams, targets 14 and 16 may be vertically lengthened such that the images produced by emitters 18 and 20 may strike targets 14 and 16, respectively, despite changes to water level within the known range. Targets 14 and 16 are preferably positioned such that they are clearly visible to the operator of boat 10 at such distance so as to facilitate ample room for maneuvering for purposes of alignment during docking.

Figure 2A:
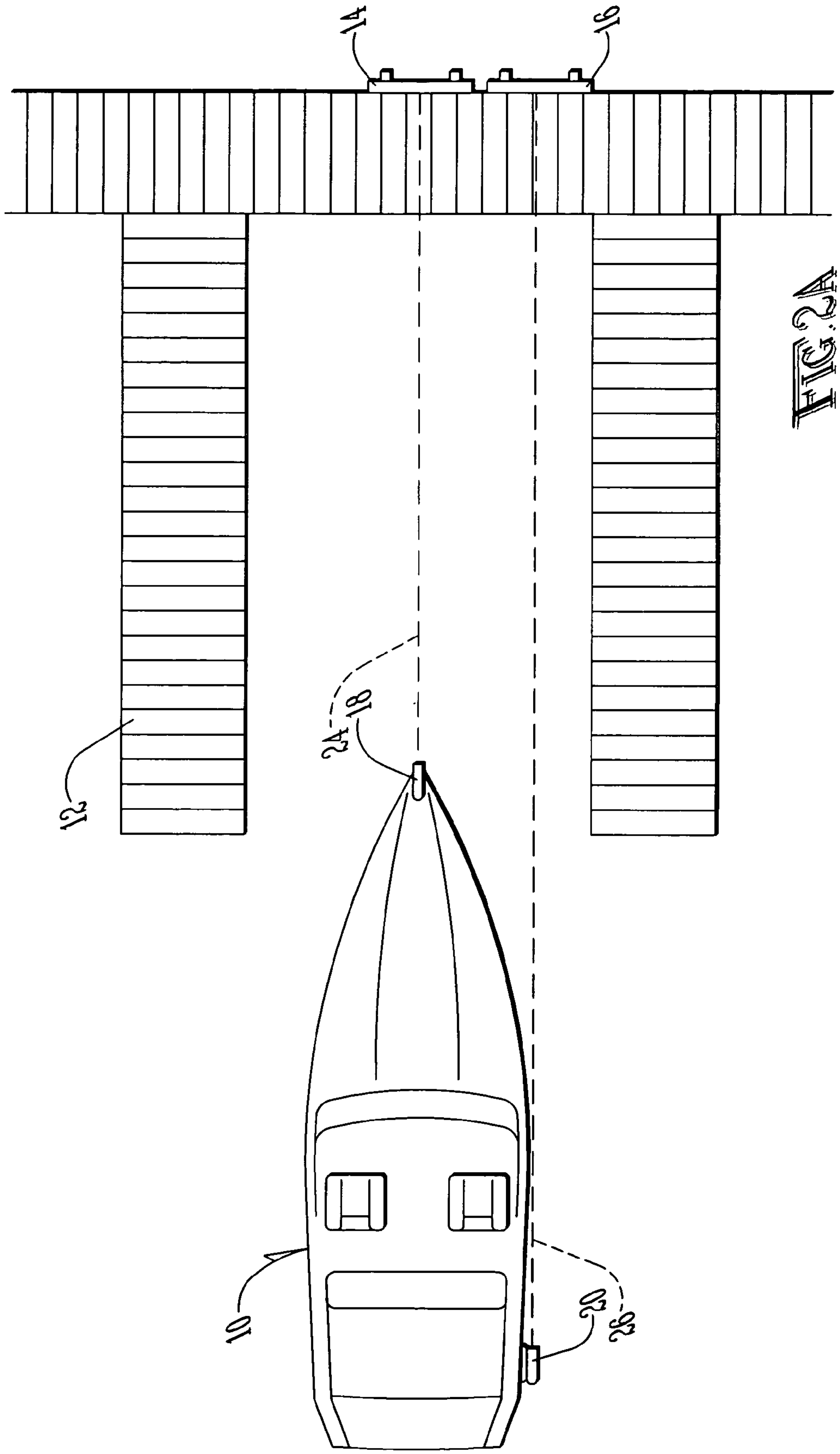
FIG. 2A is a downwardly oriented plan view of a vessel approaching a slip with correct alignment utilizing a preferred embodiment of the preferred invention.
Figure 2B:
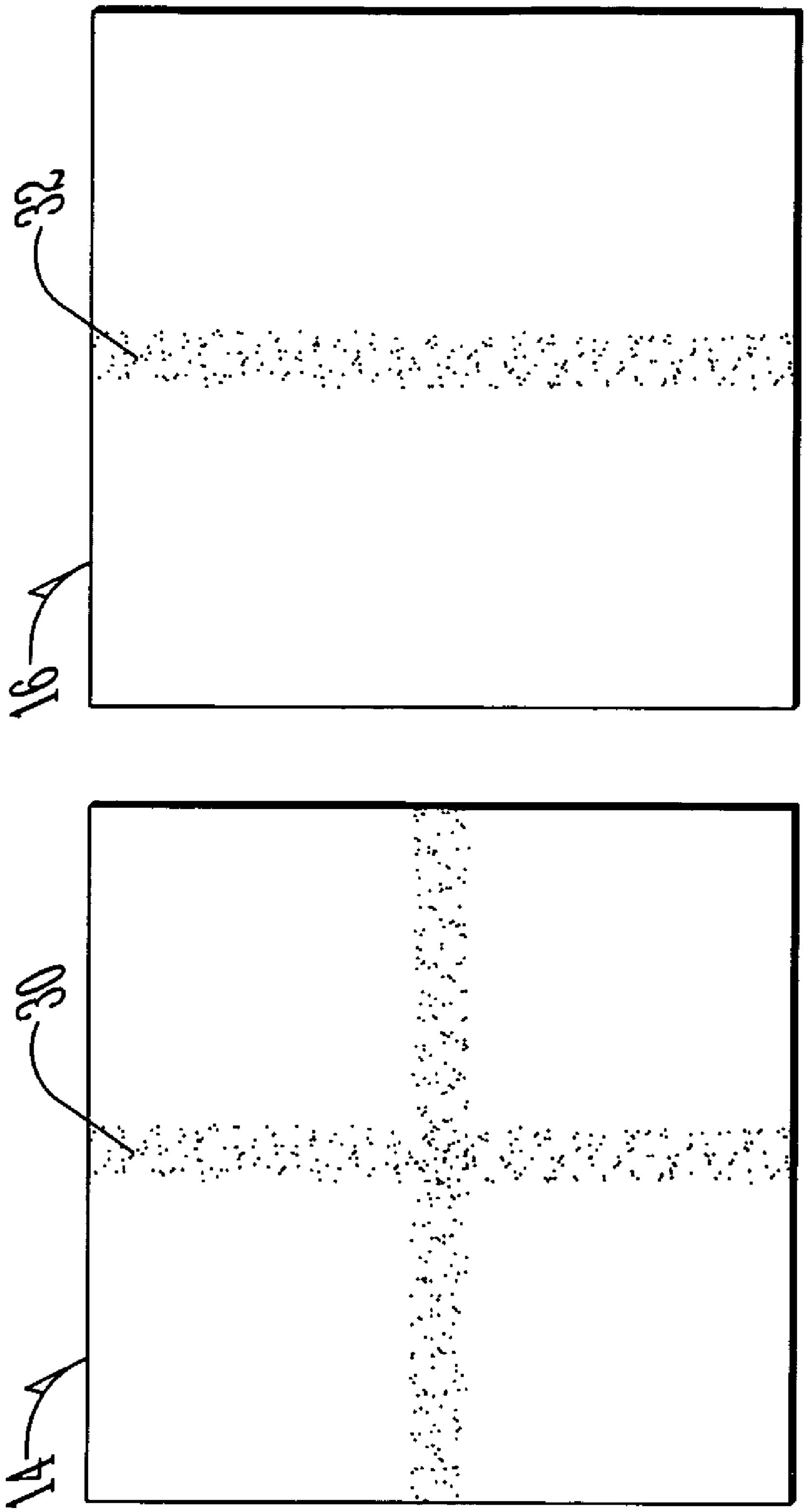
FIG. 2B is an illustration of the laser image appearing on docking targets during a docking maneuver with the vessel in a correct alignment utilizing a preferred embodiment of the preferred invention.
Figure 3A:
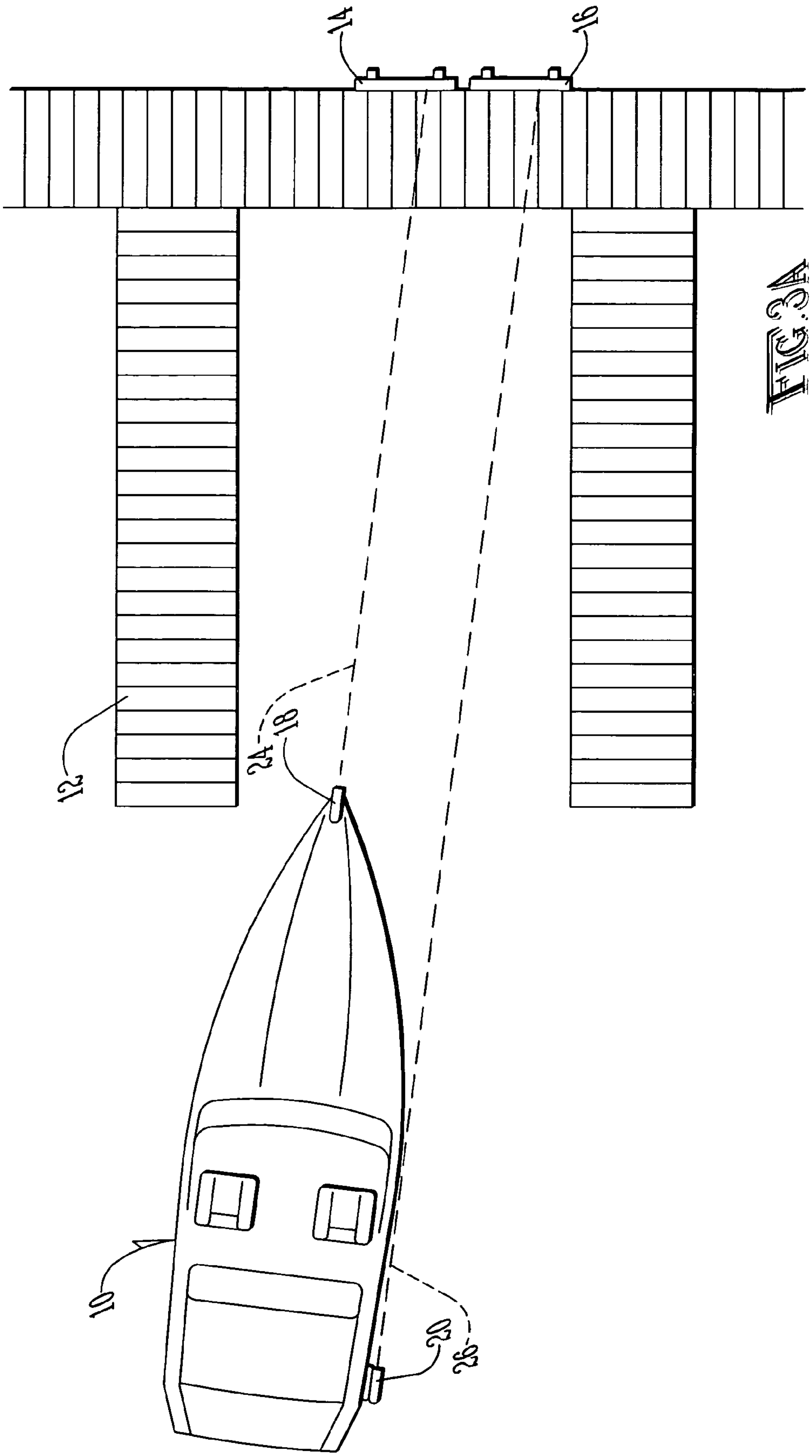
FIG. 3A is a downwardly oriented plan view of a vessel approaching a slip with incorrect alignment utilizing a preferred embodiment of the preferred invention.

Having described the elements of a preferred embodiment of the present invention, the method of using the preferred embodiment of the present invention may now be described with reference to FIGS. 2A, 2B, 3A, and 3B. As watercraft 10 approaches slip 12, the boat is roughly aligned by the pilot with slip 12, such that the two laser images generated by emitters 18 and 20 strike some portion of retro-reflective docking targets 14 and 16, respectively. Crosshair pattern 30 on target 14 results from the laser pattern generated by first emitter 18. Likewise, line pattern 32 on target 16 results from the laser pattern generated by second emitter 20. The path of the light from emitters 18 and 20 is illustrated in FIGS. 2A and 3A as first laser beam 24 and second laser beam 26, respectively. When the bow of watercraft 10 is properly aligned with first target 14, the pilot will see a crosshair pattern 30 centered on target 14, as shown in both FIGS. 2A and 3A.

It should be noted that while the crosshair pattern 30 generated by emitter 18 on target 14 appears properly centered in both FIGS. 2A and 3A, the boat is only properly aligned for passage into the slip in the case of FIG. 2A. This situation illustrates why two emitters 18 and 20 are necessary for the pilot of watercraft 10 to successfully pilot watercraft 10 into slip 12 using only information generated by the emitters. In the case of FIG. 2A, watercraft 10 is in fact properly aligned with slip 12, which may be determined by noting that the line pattern 32 generated by emitter 20 is centered on target 16, as shown in FIG. 2B. In the case of FIG. 3B, however, the pilot may quickly and readily discern that watercraft 10 is not in proper alignment for entry into slip 12 by noting that the line pattern 32 generated by, emitter 20 on target 16 appears near the right edge of target 16. This effect follows from the geometric principle that the distance between the points at which a set of two parallel lines cross a third line increases as the angle between the two parallel lines and the third line decreases from the orthogonal. A similar effect would follow if watercraft 10 were out of alignment with slip 12 in the opposite direction.

In general, it may be seen that patterns 30 and 32 on targets 14 and 16, respectively, provide the pilot with immediate information concerning the longitudinal position and axial position of watercraft 10. If, for example, the stern of watercraft 10 is too far to the left or port side for proper positioning within slip 12, the vertical portion of crosshair pattern 30 will appear on the right-hand side of target 16. Likewise, if the stern of watercraft 10 is too far to the right or starboard side for proper positioning within slip 12, the vertical portion of crosshair pattern 30 will appear on the right-hand side of target 14. In either case, the pilot of watercraft 10 may steer for correction, and may monitor his or her progress in making the correction by monitoring the movement of line pattern 32 across the face of target 16. While the position of crosshair pattern 30 may shift during the correction phase, the pilot must of course ensure that crosshair pattern 30 returns to its centered position on target 16 prior to entry into slip 12. The same principle described herein applies when a single target 15 is substituted for separate targets 14 and 16.

In addition to position and orientation information discerned as described above, the pilot of watercraft 10 may also discern distance and closure rate information from mere observation of the positions of crosshair pattern 30 and line pattern 32 on targets 14 and 16, respectively. The length of the line pattern 32 generated by emitter 20 depends upon the distance between emitter 20 and target 16. At emitter 20, line pattern 32 is only as wide as the output lens on emitter 20. Line pattern 32 becomes longer as beam 26 extends outwardly from emitter 20. Thus once emitter 20 is aligned with target 18 and watercraft 10 approaches slip 12, line pattern 32 on target 18 will appear progressively smaller. The absolute length of line pattern 32 on docking target 16 can thus be used to indicate range, and can be calibrated for the length of watercraft 10, laser beam 26 divergence angle, and docking target 18 size and orientation. Rate of closure information may be discerned by observing the rate of change in the length of line pattern 32 on target 18.

In one alternative embodiment of the invention, the retro-reflective docking targets 14 and 16 may be marked with graduations indicating the absolute range to the slip 12 based on these parameters. In the preferred embodiment, however, the graduations are not required as the pilot of watercraft 10 will, upon some familiarity with the idiosyncrasies of his or her own watercraft 10 and slip 12, quickly learn to judge the range to slip 12 based upon a simple visual inspection of the length of line pattern 32 relative to the size of retro-reflective target 16. This approach is preferred because it allows the pilot of watercraft 10 to make the quickest assessment of range information, thereby preventing the pilot of watercraft 10 from being distracted with reading fine graduations at a distance (possibly with the aid of a telescope) at a critical period during the docking process. In addition, the use of such graduations would require fine adjustment of the length of line pattern 32 by the pilot or other person responsible for maintaining watercraft 10.

In an alternative embodiment of the invention particularly well suited for employment with segmented land vehicles, such as tractor trailers, emitter 18 may be mounted on the cab of the vehicle, and emitter 20 mounted at the side of the trailer. Thus the operator of the tractor trailer could easily determine whether the trailer was properly aligned for entry into a garage, loading dock, or other limited space by determining whether emitter 20 was properly aligned on target 16, as demonstrated by the position of pattern 32. Alignment of the cab would of course be performed by determining whether emitter 18 was properly aligned on target 14, as demonstrated by the position of pattern 30.

As explained above, targets 14 and 16 may be of various shapes in alternative embodiments of the invention, including triangular. In the case of triangular targets 14 and 16, the apparent length of the vertical portions of patterns 30 and 32 incident on targets 14 and 16 may be used by the pilot of watercraft 10 to judge distance and rate of closure information. This alternative embodiment would require that the size of patterns 30 and 32 generated by emitters 18 and 20 on targets 14 and 16 be initially adjusted such that the vertical line portions of patterns 30 and 32 are longer than the distance from the base to the apex of the triangle of targets 14 and 16 at any range over which the present invention will be employed. Thus the vertical portion of patterns 30 and 32 will, when incident on targets 14 and 16, respectively, extend entirely across the face of targets 14 and 16 from top to bottom at all distances. But the portion of patterns 30 and 32 that extends beyond the perimeter of targets 14 and 16 will, of course, not be visible to the pilot of watercraft 10, as this portion of patterns 30 and 32 will not be reflected. Thus as patterns 30 and 32 from emitters 18 and 20 move horizontally across triangular-shaped targets 14 and 16, respectively, the length of the vertical line portion of patterns 30 and 32 would appear to vary. This effect occurs since a portion of the vertical lines of patterns 30 and 32 would be cut off, the size of which depends upon the horizontal position of the vertical line on targets 14 and 16. For example, if pattern 32 were to strike along the right side of target 16, line pattern 32 would appear to be shortened since triangular target 16 would be relatively small at its edge. This situation is illustrated in FIG. 4B. The longest apparent length of line pattern 32 as viewed simultaneously on both targets 14 and 16 would occur when the vertical lines in patterns 30 and 32 appear centered on the triangle of targets 14 and 16. This situation is illustrated in FIG. 4A, showing the longest possible appearance of line pattern 32. The pilot of watercraft 10 could thus adjust his position by moving the boat to maximize the apparent length of the vertical lines of patterns 30 and 32 on targets 14 and 16, thus generating an image on target 16 as shown in FIG. 4A, and thereby properly positioning watercraft 10 for entry into slip 12.

It may be noted that in the alternative embodiment utilizing targets 14 and 16 of triangular shape, the method described above for discerning distance and closure rate information cannot be utilized. Instead, the pilot of watercraft 10 could discern this information from the rate of left and right movement of patterns 30 and 32 across targets 14 and 16, respectively, based upon corrections made during the maneuver to dock watercraft 10 in slip 12.

The present invention has been described with reference to certain preferred and alternative embodiments that are intended to be exemplary only and not limiting to the full scope of the present invention as set forth in the appended claims.

What is claimed is:

1. A vehicle alignment apparatus, comprising:

(a) a first emitter mounted on the vehicle at about a centerline of the vehicle, said first emitter aligned such that an emission from said first emitter is directed along an axis parallel with the centerline of the vehicle;

(b) a second emitter mounted on the vehicle, said emitter positioned other than along a vertical plane passing through said first emitter and parallel to the centerline of the vehicles;

(c) a first target, wherein said first target is positioned externally to the vehicle, and said first target is positioned so as to receive the emission from said first emitter when the vehicle is in a desired alignment; and (d) a second target, wherein said second target is positioned externally to the vehicle, and said second target is positioned so as to receive the emission from said second emitter when the vehicle is in the desired alignment.

2. The vehicle alignment apparatus of claim 1, wherein said second emitter is aligned such that an emission from said second emitter is directed along an axis parallel with the centerline of the vehicle.

3. The vehicle alignment apparatus of claim 2, wherein the vehicle comprises a front portion and a rear portion, one of said first and second emitters is positioned in the front portion of the vehicle, and the other of said first and second emitters is positioned in the rear portion of the vehicle.

4. The vehicle alignment apparatus of claim 2, wherein the vehicle comprises a plurality of sides, and said second emitter is positioned along one of the sides of the vehicle.

5. The vehicle alignment apparatus of claim 4, wherein said first emitter is positioned in the front portion of the vehicle, and said second emitter is positioned in the rear portion of the vehicle.

6. The vehicle alignment apparatus of claim 5, wherein said first emitter comprises a laser crosshair generator and said second emitter comprises a laser line generator.

7. The vehicle alignment apparatus of claim 1, wherein said first target comprises a diffusive material wherein emissions striking said first target are reflected in a wide angle.

8. The vehicle alignment apparatus of claim 1, wherein said first and second emitters each comprise a laser generator.

9. The vehicle alignment apparatus of claim 8, wherein one of said first and second emitters comprises a laser crosshair pattern generator.

10. The vehicle alignment apparatus of claim 8, wherein one of said first and second emitters comprises a laser line pattern generator.

11. The vehicle alignment apparatus of claim 1 wherein said first target is mounted to one of a slip, a dock, and a trailer.

12. An apparatus for assistance in guidance into a limited space, comprising:

(a) a vehicle capable of entry within the limited space, said vehicle comprising a centerline;

(b) a first emitter mounted on said vehicle along a line parallel to said centerline of said vehicle;

(c) a second emitter mounted on said vehicle along a line parallel to said centerline of said vehicle;

(d) a first target mounted at the limited space, wherein said first emitters is aligned with said first target when said vehicle is aligned properly for entry into the limited space; and (e) a second target mounted the limited space, wherein said second emitter is aligned with said second target when said vehicle is aligned properly for entry into the limited space.

13. The apparatus of claim 12, wherein said vehicle comprises a front portion and a rear portion, one of said first and second emitters is mounted in said front portion of said vehicle, and the other of said first and second emitters is mounted in said rear portion of said vehicle.

14. An alignment system, comprising:

(a) a vehicle;

(b) a first emitter mounted on said vehicle, wherein said first emitter is adapted to produce a first emission;

(c) a second emitter mounted on said vehicle, wherein said second emitter is adapted to produce a second emission; and (d) a limited space adapted to receive said vehicle, wherein said limited space comprises first and second targets and is adaptable to receive said first and second emissions at said first and second targets, respectively, and reflect said first and second emissions to said vehicle when said vehicle is properly aligned for entry into said limited space.

15. The alignment system of claim 14, wherein said vehicle comprises a centerline and a side, said first emitter is mounted at about said centerline of said vehicle, and said second emitter is mounted at about said side of said vehicle.

16. The alignment system of claim 14, wherein said vehicle comprises a front portion and a rear portion, said first emitter is mounted at about said front portion of said vehicle, and said second emitter is mounted at about said rear portion of said vehicle.

* * * * *